(12) United States Patent
Cardona

(10) Patent No.: US 10,221,984 B2
(45) Date of Patent: Mar. 5, 2019

(54) HIGH-PRESSURE CRYOGENIC FLUID CONDUIT

(71) Applicant: Zena Associates, LLC, Folcroft, PA (US)

(72) Inventor: Robert Cardona, Cinnaminson, NJ (US)

(73) Assignee: Zena Associates, LLC, Folcroft, PA (US)

( * ) Notice: Subject to any disclaimer, the term of this patent is extended or adjusted under 35 U.S.C. 154(b) by 263 days.

(21) Appl. No.: 15/150,970

(22) Filed: May 10, 2016

(65) Prior Publication Data

US 2017/0328508 A1    Nov. 16, 2017

(51) Int. Cl.
| | |
|---|---|
| *F16K 17/36* | (2006.01) |
| *F16L 17/06* | (2006.01) |
| *F16L 55/10* | (2006.01) |
| *F25D 29/00* | (2006.01) |

(52) U.S. Cl.
CPC ....... *F16L 55/1007* (2013.01); *F16L 55/1022* (2013.01); *F25D 29/001* (2013.01)

(58) Field of Classification Search
CPC .. F16L 55/1007; F16L 55/1022; F25D 29/001
USPC .............. 137/68.14; 277/314, 595, 647, 653
See application file for complete search history.

(56) References Cited

U.S. PATENT DOCUMENTS

| | | | |
|---|---|---|---|
| 1,304,364 A | 5/1919 | Phillips | |
| 2,054,561 A | 9/1936 | Greenberg | |
| 2,165,640 A | 7/1939 | Marx | |
| 3,273,578 A | 9/1966 | Clark | |
| 3,561,793 A | 2/1971 | Rode | |
| 3,630,214 A | 12/1971 | Levering | |
| 3,802,456 A | 1/1974 | Wittgenstein | |
| 3,859,692 A | 1/1975 | Waterman | |
| 3,907,336 A | 9/1975 | Siegmund | |
| 3,910,312 A | 10/1975 | Weinhold | |
| 3,913,603 A | 10/1975 | Torres | |

(Continued)

FOREIGN PATENT DOCUMENTS

| | | |
|---|---|---|
| GB | 2342709 A | 4/2000 |
| WO | 2005001327 A1 | 1/2005 |

(Continued)

OTHER PUBLICATIONS

European search report, dated Oct. 2, 2017, 10 pages.

(Continued)

*Primary Examiner* — Minh Le
(74) *Attorney, Agent, or Firm* — Barley Snyder

(57) ABSTRACT

High-pressure cryogenic fluid conduits that deliver high-pressure cryogenic fluids from a first point to a second point. This high-pressure fluid conduit has a safety feature that is activated when the high-pressure cryogenic fluid conduit fails due to exposure to a predetermined force. The safety feature is activated by the fracture of an annular ring that is positioned at either end of the high-pressure fluid conduit and is calibrated to fracture when exposed to the predetermined force. Fracture of the annular ring closes valves at each end of the high-pressure fluid conduit, thereby stopping the flow of high-pressure fluid from the high-pressure fluid source as well as the escape of high-pressure fluid from the high-pressure fluid container.

23 Claims, 11 Drawing Sheets

(56) References Cited

U.S. PATENT DOCUMENTS

| | | | |
|---|---|---|---|
| 4,023,584 A | 5/1977 | Rogers et al. | |
| 4,098,438 A | 7/1978 | Taylor | |
| 4,351,351 A | 4/1982 | Flory et al. | |
| 4,509,558 A | 4/1985 | Slater | |
| 4,614,201 A | 9/1986 | King et al. | |
| 4,735,083 A | 4/1988 | Tenenbaum | |
| 4,749,282 A * | 6/1988 | Spargo | F16C 32/0666 |
| | | | 384/10 |
| 4,827,977 A | 5/1989 | Fink, Jr. | |
| 4,828,183 A | 5/1989 | Fink, Jr. | |
| 4,886,087 A | 12/1989 | Kitchen | |
| 4,896,688 A | 1/1990 | Richards et al. | |
| 4,921,000 A | 5/1990 | King et al. | |
| 5,054,523 A | 10/1991 | Rink | |
| 5,099,870 A | 3/1992 | Moore et al. | |
| 5,172,730 A | 12/1992 | Driver | |
| 5,250,041 A | 10/1993 | Folden et al. | |
| 5,343,738 A | 9/1994 | Skaggs | |
| 5,357,998 A | 10/1994 | Abrams | |
| 5,427,155 A | 6/1995 | Williams | |
| 5,497,809 A | 3/1996 | Wolf | |
| 5,518,034 A | 5/1996 | Ragout et al. | |
| 5,531,357 A | 7/1996 | Guilmette | |
| 5,551,484 A | 9/1996 | Charboneau | |
| 5,654,499 A | 8/1997 | Manuli | |
| 5,714,681 A | 2/1998 | Furness et al. | |
| 5,730,445 A * | 3/1998 | Swensen | F16J 15/0887 |
| | | | 277/608 |
| 5,765,587 A | 6/1998 | Osborne | |
| 5,803,127 A | 9/1998 | Rains | |
| 5,868,170 A | 2/1999 | Spengler | |
| 5,931,184 A | 8/1999 | Armenia et al. | |
| 6,260,569 B1 | 7/2001 | Abrams | |
| 6,349,736 B1 | 2/2002 | Dunmire | |
| 6,546,947 B2 | 4/2003 | Abrams | |
| 6,692,034 B2 | 2/2004 | Drube et al. | |
| 6,840,277 B1 * | 1/2005 | Nimberger | F16L 29/04 |
| | | | 137/614.05 |
| 6,899,131 B1 | 5/2005 | Carmack et al. | |
| 6,938,636 B1 * | 9/2005 | Nimberger | F16L 29/04 |
| | | | 137/15.09 |
| 7,252,112 B1 | 8/2007 | Imler et al. | |
| 7,264,014 B2 | 9/2007 | Goldstein | |
| 7,287,544 B2 | 10/2007 | Seneviratne et al. | |
| 8,336,570 B2 | 12/2012 | Cardona | |
| 8,800,586 B2 | 8/2014 | Abrams | |
| 9,121,536 B2 * | 9/2015 | Cardona | F16L 55/1007 |
| 9,625,074 B2 * | 4/2017 | Cardona | F16L 37/30 |
| 2002/0007847 A1 | 1/2002 | Abrams | |
| 2003/0188799 A1 | 10/2003 | Cessac et al. | |
| 2004/0123899 A1 | 7/2004 | Turvey | |
| 2005/0061366 A1 | 3/2005 | Rademacher | |
| 2005/0263193 A1 | 12/2005 | Carmack et al. | |
| 2008/0035222 A1 | 2/2008 | Fraser | |
| 2010/0276008 A1 | 11/2010 | Abrams | |
| 2011/0214750 A1 * | 9/2011 | Abrams | F16K 17/14 |
| | | | 137/68.15 |
| 2012/0234423 A1 | 9/2012 | Cardona | |
| 2013/0048110 A1 | 2/2013 | Wolff | |
| 2016/0252046 A1 * | 9/2016 | Swasey | F16J 15/0818 |
| | | | 277/595 |

FOREIGN PATENT DOCUMENTS

| | | |
|---|---|---|
| WO | 2011109664 A1 | 9/2011 |
| WO | 2014205322 A2 | 12/2014 |

OTHER PUBLICATIONS

Website for HPF, Inc., Breakaway Couplings, www.hpflap.com, HPF, Inc., 13450 Indian Creek, Cleveland, Ohio 44130, Tel: 440-816-2195, 1-800-445-1289, Fax: 440-816-2196, 2 paegs, Copyright 2006.

Advertisement, Smalley Wave Springs, www.tfc.eu.com, 4 pages, Copyright 2008-2011.

Website, CSE IPG, Safety Breakaway Coupling, www.cse-ipg.com, 2 pages, Copyright 2000-2010.

PCT Notification of Transmittal, International Search Report and The Written Opinion of the International Searching Authority, International Application No. PCT/US2014/043364, dated Jan. 8, 2015, 10 pages.

PCT Notification of Transmittal, International Search Report and The Written Opinion of the International Searching Authority, International Application No. PCT/US2014/043362, dated Jan. 5, 2015, 8 pages.

PCT Notification of Transmittal, International Preliminary Report on Patentability and Written Opinion of the International Searching Authority, International App. No. PCT/US2014/043362, dated Dec. 30, 2015, 6 pages.

* cited by examiner

HIGH-PRESSURE CRYOGENIC FLUID CONDUIT

FIELD OF THE INVENTION

The present invention relates, in general, to the delivery of high-pressure cryogenic fluids and, in particular, to a high-pressure cryogenic fluid conduit having a safety feature that provides protection against a failure in the delivery system or errors by a workman conducting the fluid delivery operation.

BACKGROUND

When filling containers (e.g., cylinders, tank trucks, rail cars, and stationary tanks) with cryogenic fluids, either compressed or non-compressed, in either gas or liquid form, or operating equipment that relies on pressurized fluid flow, the fluid is transferred from one container (e.g., a tank truck) to another container (e.g., a stationary tank). The fluid can be transferred from one container to another via solid piping or by a flexible conduit or hose. A flexible hose allows ease of connection/disconnection between the containers, as well as a limited range of motion between the source of the fluid and the destination of the fluid.

For example, cryogenic fluids are transported, stored, and used in individual containers of varying size and capacity. In order to fill these containers with a cryogenic fluid, each container is connected, either singly or in groups, to a fluid filler/seller. In order to connect each container to the filling connection, a flexible hose is used to allow for quick connection/disconnection of the containers to and from the filling connection. A filling station manifold is one example of a filling connection.

There are various safety risks associated with transferring fluids from one container to another. Components in fluid delivery systems might fail or service personnel conducting fluid delivery operations might make human errors, such as driving a tank truck away after filling a container without disconnecting the hose from the tank truck and/or the filled container.

Hoses can fail even though they are generally made from durable, yet flexible, materials/constructions, such as treated and reinforced rubber, neoprene, nylon, stainless steel, and others. Hose failures, such as leaks, ruptures, splits, and cuts, can result, for example, from material deterioration of the hose or accidentally damaging the hose by operation of other equipment in the vicinity.

When a hose fails, regardless of the cause of the failure, substantial damage can result in a number of ways. First, if a hose is completely severed or split, both ends of the hose can whip around wildly under the forces of the compressed fluid that is exerted from the delivery end and the receiving end. In addition, if a container is not secured, the pressure of the fluid leaving the container can cause the container to move very rapidly in the opposite direction of the escaping fluid. Both of these situations can result in substantial risk of personal injury, as well as property damage. Furthermore, a hose failure can cause leaks from both the delivery and receiving ends, leading to a costly waste of the fluid, as well as the discharge of a hazardous fluid, that has the potential of filling the environment with hazardous fumes.

SUMMARY

In a first embodiment of the present invention, a high-pressure cryogenic fluid conduit, adapted for connection between a high-pressure cryogenic fluid source and a high-pressure cryogenic fluid container, includes a hose unit having a first end and a second end, a first housing adapted for connection to the high-pressure cryogenic fluid source, and a second housing adapted for connection to the high-pressure cryogenic fluid container. The first housing has (a) a first fluid opening through which high-pressure cryogenic fluid from the high-pressure cryogenic fluid source enters the first housing, (b) a second fluid opening through which high-pressure cryogenic fluid from the high pressure cryogenic fluid source leaves the first housing and enters the hose unit, and (c) a cavity between the first fluid opening in the first housing and the second fluid opening in the first housing. The second housing has a first fluid opening through which (a) high-pressure cryogenic fluid from the high-pressure cryogenic fluid source leaves the hose unit and enters the second housing, and (b) high-pressure cryogenic fluid from the high-pressure cryogenic fluid container tends to leave the second housing and enter the hose unit during a failure of the hose unit. The second housing also has a second fluid opening through which (a) high-pressure cryogenic fluid from the high-pressure cryogenic fluid source leaves the second housing and enters the high-pressure cryogenic fluid container, and (b) high-pressure cryogenic fluid from the high-pressure cryogenic fluid container tends to enter the hose unit during a failure of the hose unit. The second housing also has a cavity between the first fluid opening in the second housing and the second fluid opening in the second housing. This first embodiment of the present invention also has a coupling that couples at least one of the first housing to the first end of the hose unit and the second housing to the second end of the hose unit. This coupling has a weakened section that fractures when a predetermined force is applied to the coupling that causes first and second parts of the-coupling on opposite sides of the weakened section to separate. This first embodiment of the present invention further has a cryogenic seal that extends between and secured to at least one of the first housing and the first end of the hose unit and the second housing and the second end of the hose unit. This cryogenic seal is breakable when the first and second parts of the coupling separate. This first embodiment of the present invention further has a first valve seat at the second fluid opening in the first housing, a second valve seat at the first fluid opening in the second housing, a first valve body mounted in the cavity of the first housing, and a second valve body mounted in the cavity of the second housing. The first valve body is movable between a first position to permit the flow of the high-pressure cryogenic fluid from the high-pressure cryogenic fluid source through the first housing and a second position against the first valve seat in the first housing to prevent high-pressure cryogenic fluid leaving the first housing. The second valve body is movable between a first position to permit the flow of the high-pressure cryogenic fluid from the high-pressure cryogenic fluid source through the second housing and a second position against the second valve seat in the second housing to prevent the flow of high-pressure cryogenic fluid from the high-pressure cryogenic fluid container leaving the second housing. This first embodiment of the present invention also has a valve control that retains the first valve body in its first position and the second valve body in its first position and selectively moves the first valve body to its second position and the second valve body to its second position in response to fracture of the coupling and separation of the first and second parts of the coupling on opposite sides of the weakened section of the coupling.

In a second embodiment of the present invention, a high-pressure cryogenic fluid conduit, adapted for connection between a high-pressure cryogenic fluid source and a high-pressure cryogenic fluid container includes a first housing adapted for connection to a high-pressure cryogenic fluid source and a second housing abutting the first housing and adapted for connection to a high-pressure cryogenic fluid container. The first housing has (a) a first fluid opening through which high-pressure cryogenic fluid from a high-pressure cryogenic fluid source enters the first housing, (b) a second fluid opening through which high-pressure cryogenic fluid from the high-pressure cryogenic fluid source leaves the first housing, and (c) a cavity between the first fluid opening in the first housing and the second fluid opening in the housing. The second housing has a (a) first fluid opening aligned with the second fluid opening of the first housing and through which high-pressure cryogenic fluid leaving the first housing enters the second housing, (b) a second fluid opening through which high-pressure cryogenic fluid from the high-pressure cryogenic fluid source entering the second housing leaves the second housing and high-pressure cryogenic fluid from the high-pressure cryogenic fluid container tends to reenter the second housing upon separation of the first housing and the second housing, and (c) a cavity between the first fluid opening in the second housing and the second fluid opening in the second housing. This second embodiment of the present invention also has a coupling that couples the first housing to the second housing. This coupling has a weakened break-away section that fractures when a predetermined force is applied to the coupling that causes parts of the coupling to separate and permits separation of the first housing and the second housing. This second embodiment of the present invention also has a cryogenic seal extending between and secured to the first housing and the second housing and is breakable when the parts of the coupling separate. Also included in this second embodiment of the present invention are a valve seat at the second fluid opening in the first housing, a valve seat at the first fluid opening in the second housing, a first valve body mounted in the cavity of the first housing, and a second valve body mounted in the cavity of the second housing. The first valve body is movable between a first position to permit the flow of the high-pressure cryogenic fluid from the high-pressure cryogenic fluid source through the first housing and a second position against the valve seat in the first housing to prevent high-pressure cryogenic fluid leaving the first housing. The second valve body is movable between a first position to permit the flow of the high-pressure cryogenic fluid from the high-pressure cryogenic fluid source through the second housing and a second position against the valve seat in the second housing to prevent the flow of high-pressure cryogenic fluid leaving the second housing. This second embodiment of the present invention also has a valve control that retains the first valve body in its first position and the second valve body in its first position and selectively moves the first valve body towards its second position and the second valve body towards its second position in response to fracture of the coupling and separation of the parts of the coupling.

DETAILED DESCRIPTION OF THE EMBODIMENT(S)

Figure 1:
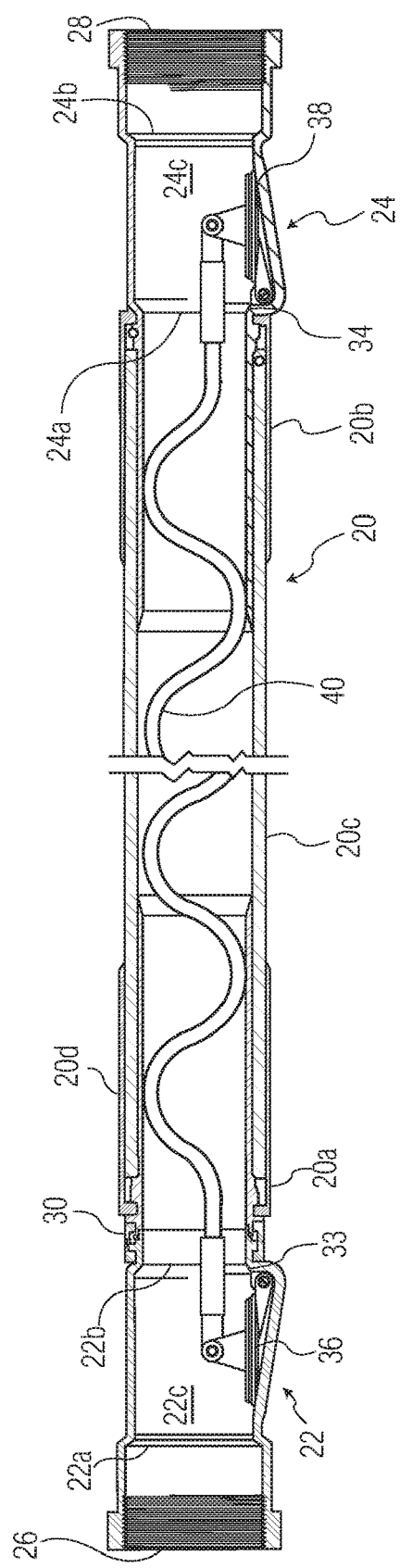
FIG. 1 is a sectional view of a first embodiment of a high-pressure cryogenic fluid conduit, constructed in accordance with the present invention, shown in the open or normal mode of operation.

Referring to FIGS. 1 through 9, a high-pressure cryogenic fluid conduit, constructed in accordance with a first embodiment of the present invention, includes a hose unit 20 having a first end 20a and a second end 20b, a first housing 22, and a second housing 24. First housing 22 is adapted for connection to a high-pressure cryogenic fluid source, such as a tank truck, and second housing 24 is adapted for connection to a high-pressure cryogenic fluid container, such as a storage tank. The high-pressure cryogenic fluid source is represented by a threaded member 26 that can be an outlet connection of the high-pressure cryogenic fluid source for delivery of cryogenic fluid from the high-pressure cryogenic fluid source. The high-pressure cryogenic fluid container is represented by a threaded member 28 that can be an inlet connection of the high-pressure cryogenic fluid container for delivery of cryogenic fluid to the high-pressure cryogenic fluid container.

First housing 22 has a first fluid opening 22a through which high-pressure cryogenic fluid from the high-pressure cryogenic fluid source enters the first housing, a second fluid opening 22b through which high-pressure cryogenic fluid from the high-pressure cryogenic fluid source leaves the first housing and enters hose unit 20, and a cavity 22c between first fluid opening 22a in the first housing and second fluid opening 22b in the first housing.

Second housing 24 has a first fluid opening 24a through which high-pressure cryogenic fluid from the high-pressure cryogenic fluid source leaves hose unit 20 and enters the second housing during normal delivery of the cryogenic fluid to the high-pressure cryogenic fluid container or high-pressure cryogenic fluid from the high-pressure cryogenic fluid container tends to leave the second housing and enter the hose unit during a failure of the hose unit. Second housing 24 also has a second fluid opening 24b through which high-pressure cryogenic fluid from the high-pressure cryogenic fluid source leaves the second housing and enters the high-pressure cryogenic fluid container during normal delivery of the cryogenic fluid to the high-pressure cryogenic fluid container or high pressure cryogenic fluid from the high-pressure cryogenic fluid container tends to enter the second housing during a failure of the hose unit. Second housing 24 also has a cavity 24c between first fluid opening 24a in the second housing and second fluid opening 24b in the second housing.

Figure 5:
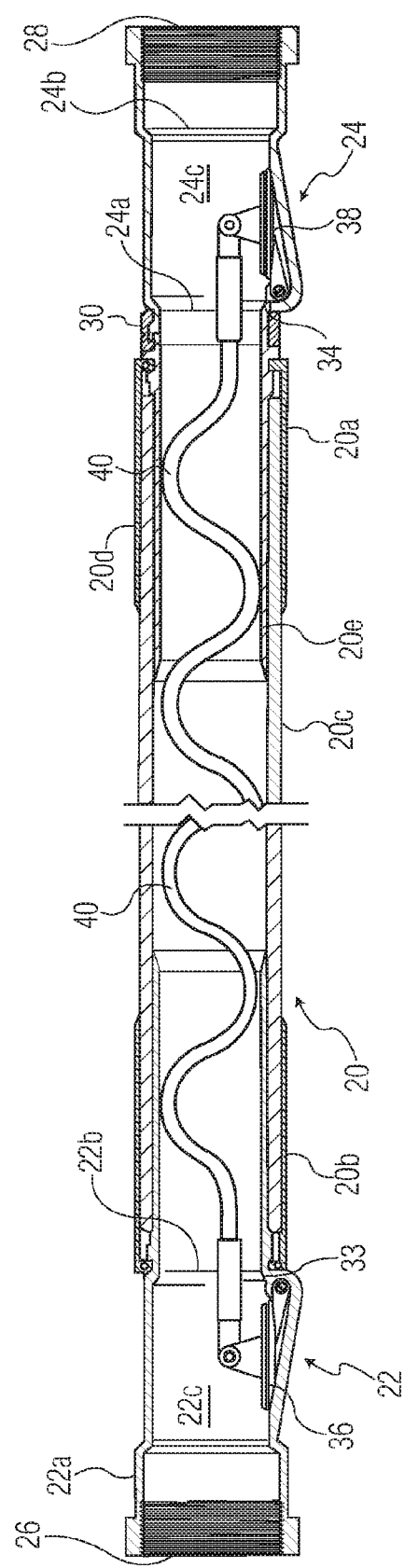
FIG. 5 is a sectional view of a second embodiment of a high-pressure cryogenic fluid conduit, constructed in accordance with the present invention, shown in the open or normal mode of operation.

A high-pressure cryogenic fluid conduit, constructed in accordance with the present invention, also includes an annular ring 30 that (a) couples first housing 22 to first end 20a of hose unit 20, as illustrated in FIGS. 1, 3, 6, and 6A, or (b) couples second housing 24 to second end 20b of hose unit 20, as illustrated in FIG. 5, or (c) couples each end of hose unit 20 to one of the housings. As will be explained below, annular ring 30 serves as a break-away component that fractures when a predetermined force is applied to the annular ring that results, for example, when the driver of a tank truck fails to disconnect the high-pressure cryogenic fluid conduit from either the tank truck or the storage container before driving the tank truck away from the storage container. Upon fracture of annular ring 30, a safety feature is activated and the high-pressure cryogenic fluid conduit switches from an open or normal mode of operation to a closed or safety-activated mode of operation.

Figure 6:
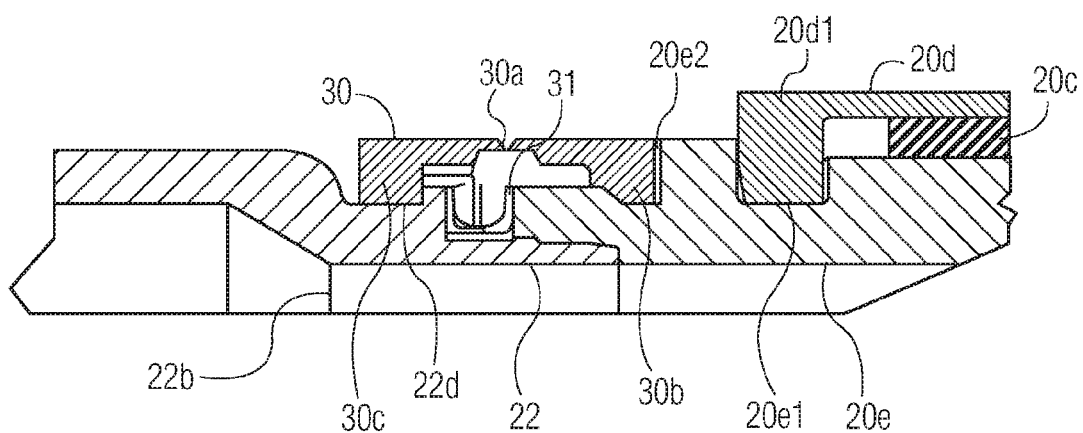
FIG. 6 is a sectional view, on an enlarged scale, that illustrates the break-away portion of the FIG. 1 high-pressure cryogenic fluid conduit while the high-pressure cryogenic fluid conduit is in the open or normal mode of operation.
Figure 6A:
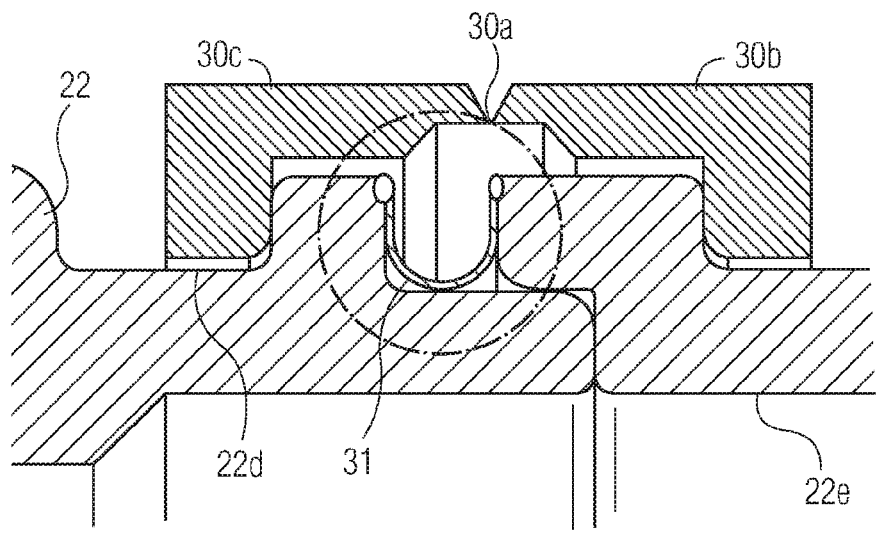
FIG. 6A is a sectional view, on an enlarged scale, of the FIG. 6 portion of the FIG. 1 high-pressure cryogenic fluid conduit.
Figure 8:
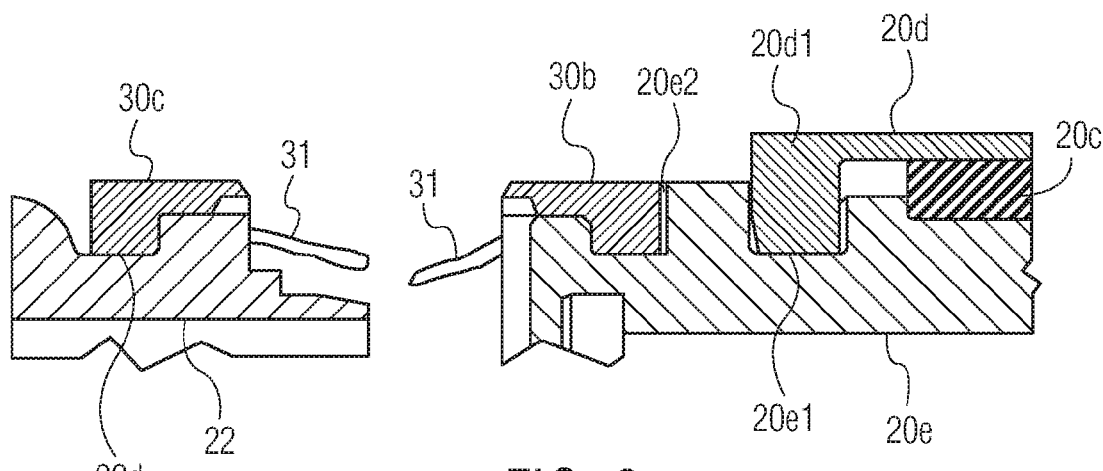
FIG. 8 is a sectional view, on an enlarged scale, that illustrates the break-away portion of the FIG. 1 high-pressure cryogenic fluid conduit after the high-pressure cryogenic fluid conduit switches to the FIG. 2 closed or safety-activated mode of operation.

As shown most clearly in FIGS. 6 and 6A, annular ring 30 has a weakened section, in the form of a groove 30a, for the embodiment of the present invention that is illustrated and being described. Groove 30a extends circumferentially completely around annular ring 30, thereby resulting in a section of reduced thickness relative to the thickness of first and second parts 30b and 30c of the annular ring that are disposed on opposite sides of the weakened section, namely groove 30a. The size, shape, and extent of groove 30a calibrate annular ring 30 to fracture when a predetermined force is applied to the annular ring, whereupon first and second parts 30b and 30c of the annular ring separate as illustrated in FIG. 8. It should be noted that this force, when applied generally along the longitudinal axis of the high-pressure cryogenic fluid conduit, will result in substantially uniform separation of first and second parts 30b and 30c of the annular ring along groove 30a, while a force applied at an angle to the longitudinal axis of the high-pressure cryogenic fluid conduit will result in progressive separation of first and second parts 30b and 30c of the annular ring along groove 30a. For more details about annular ring 30 and the manner in which it functions to couple two parts together and permits the two parts to separate when a predetermined force is applied to the annular ring, reference should be made to U.S. Pat. No. 8,336,570.

Hose unit 20 includes a fluid conducting hose 20c, first connecting means at a first end 20a of the hose unit for connecting a first end of the fluid conducting hose to first part 30b of annular ring 30 and second connecting means at second end 20b of hose unit 20 for connecting a second end of the fluid conducting hose to second housing 24. For the embodiment of the present invention that is illustrated and being described, fluid conducting hose 20c is secured at end 20a of hose unit 20 between an outer sleeve 20d and an inner sleeve 20e by suitable means, such as teeth on the contact surfaces of the sleeves that penetrate the surface of the fluid conducting hose, as illustrated. Hose unit 20 is arranged in a similar manner at second end 20b of the hose unit. It will be apparent, to those skilled in the art, that fluid conducting hose 20c can be connected to part 30b of annular ring 30 and to the second connecting means at second end 20b of hose unit 20 by other means, such as by welding or adhesives, depending, for example, on the materials chosen for the components that are being connected.

FIGS. 6, 6A, 6B, and 8 show how the first end of fluid conducting hose 20c at the first end 20a of hose unit 20 is connected to first part 30b of annular ring 30. Outer sleeve 20d of hose unit 20 has a shoulder 20d1 that is fitted into a notch 20e1 in inner sleeve 20e. Inner sleeve 20e has a second notch 20e2 into which first part 30b of annular ring 30 is fitted.

FIGS. 6, 6A, 6B, and 8 also show how first housing 22 is connected at second opening 22b of the first housing to second part 30c of annular ring 30. Housing 22 has a notch 22d into which second part 30c of annular ring 30 is fitted.

Figure 6B:
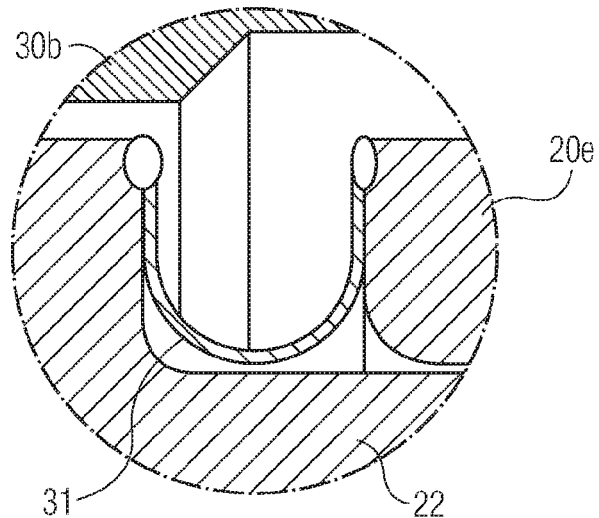
FIG. 6B is a sectional view, on an enlarged scale, of the FIG. 6A portion of the FIG. 1 high-pressure cryogenic fluid conduit.

As shown in FIGS. 6, 6A, and 6B, a cryogenic fluid conduit, constructed in accordance with the present invention, also includes cryogenic seal 31 seals the joint at which annular ring 30 couples hose unit 20 to first housing 22. Cryogenic seal 31 extends between and is secured to first housing 22 and first end 20a of hose unit 20 and is breakable when first part 30b and second part 30c of annular ring 30 separate. For the embodiment of the invention illustrated and being described, cryogenic seal 31 is U-shaped. Cryogenic seal 31 can take other forms or configurations.

Also, for the embodiment of the invention illustrated and being described, cryogenic seal 31 a metal, such as stainless steel, that is welded to first housing 22 and first end 20a of hose unit 20. Cryogenic seal 31, flexible in nature, can be made of other materials, so long as it breaks when first part 30b and second part 30c of annular ring 30 separate. Also, cryogenic seal 31 can be secured to first housing 22 and first end 20a of hose unit 20 by other means.

If the present invention is arranged with annular ring 30 coupling hose unit 20 to second housing 24, a cryogenic seal, similar to cryogenic seal 31, is provided between and secured to second housing 24 and second end 20b of hose unit 20.

When a force is applied to annular ring 30, such as when a tank truck, represented by reference numeral 26, pulls away without disconnecting from first housing 22, second part 30c of annular ring 30 is drawn in the direction of the applied force, while first part 30b of the annular ring is restrained from moving in the same direction because of its engagement in notch 20e2 in hose unit 20. When the applied force exceeds the predetermined level for which annular ring 30 has been calibrated, the annular ring will fracture along groove 30a as shown in FIG. 8. Cryogenic seal 31 will break or tear at the same time. The fracture of annular ring 30, along with the breaking of cryogenic seal 31, activates the safety feature of the present invention and the cryogenic high-pressure fluid conduit switches from the open or normal mode of operation to the closed or safety-activated mode of operation, as will be described below.

When, as illustrated in FIG. 5, a break-away annular ring 30 is located at the second end of hose unit 20 and couples the hose unit to second housing 24, a cryogenic seal is positioned between and is secured to second housing 24 and second end 20b of hose unit 20. The construction, functioning, and operation of this embodiment of the present invention are, in all other respects, identical to the embodiment that has been described above. As noted above, a high-pressure cryogenic fluid conduit, constructed in accordance with the present invention, can be arranged with a break-away annular ring at both ends of hose unit 20 when the hose unit is coupled to the high-pressure cryogenic fluid source and the high-pressure cryogenic fluid container. In certain applications, such an arrangement for activating the safety feature of the present invention might be mandatory or highly desirable.

Figure 2:
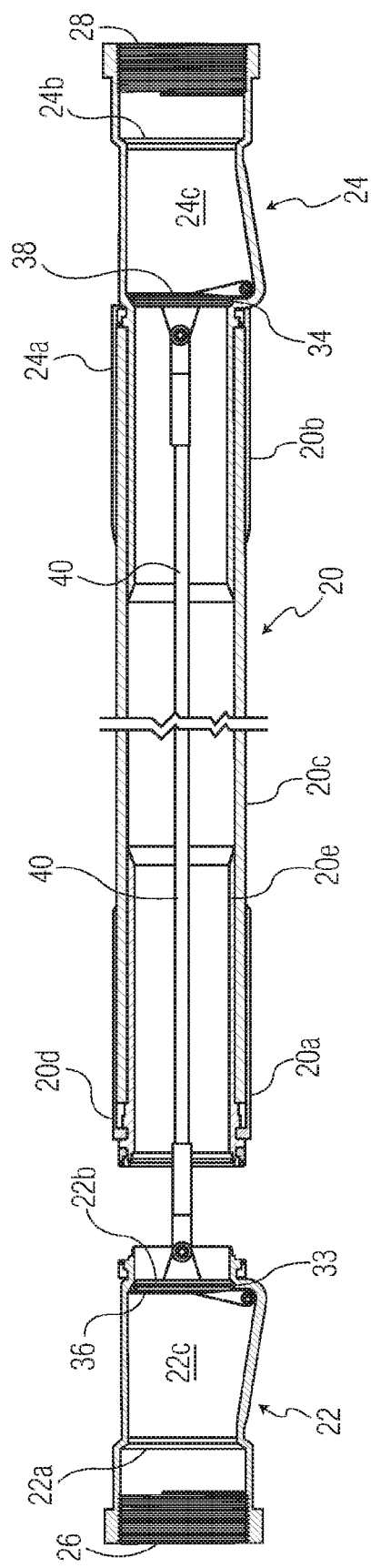
FIG. 2 is a sectional view of the FIG. 1 high-pressure cryogenic fluid conduit shown in the closed or safety-activated mode of operation.
Figure 3:
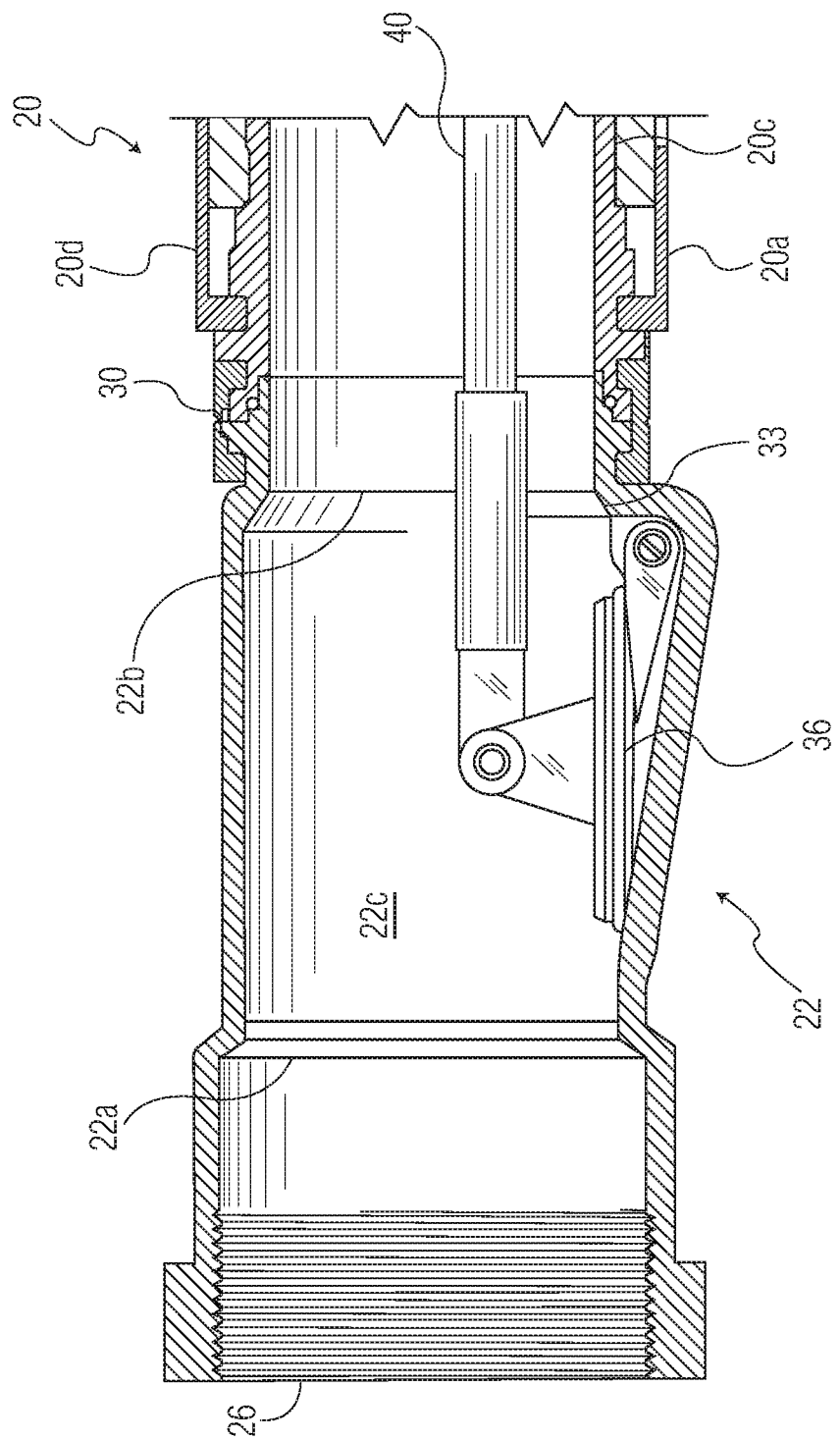
FIG. 3 is a sectional view, on an enlarged scale, of one end of the FIG. 1 high-pressure cryogenic fluid conduit shown in the open or normal mode of operation.
Figure 4:
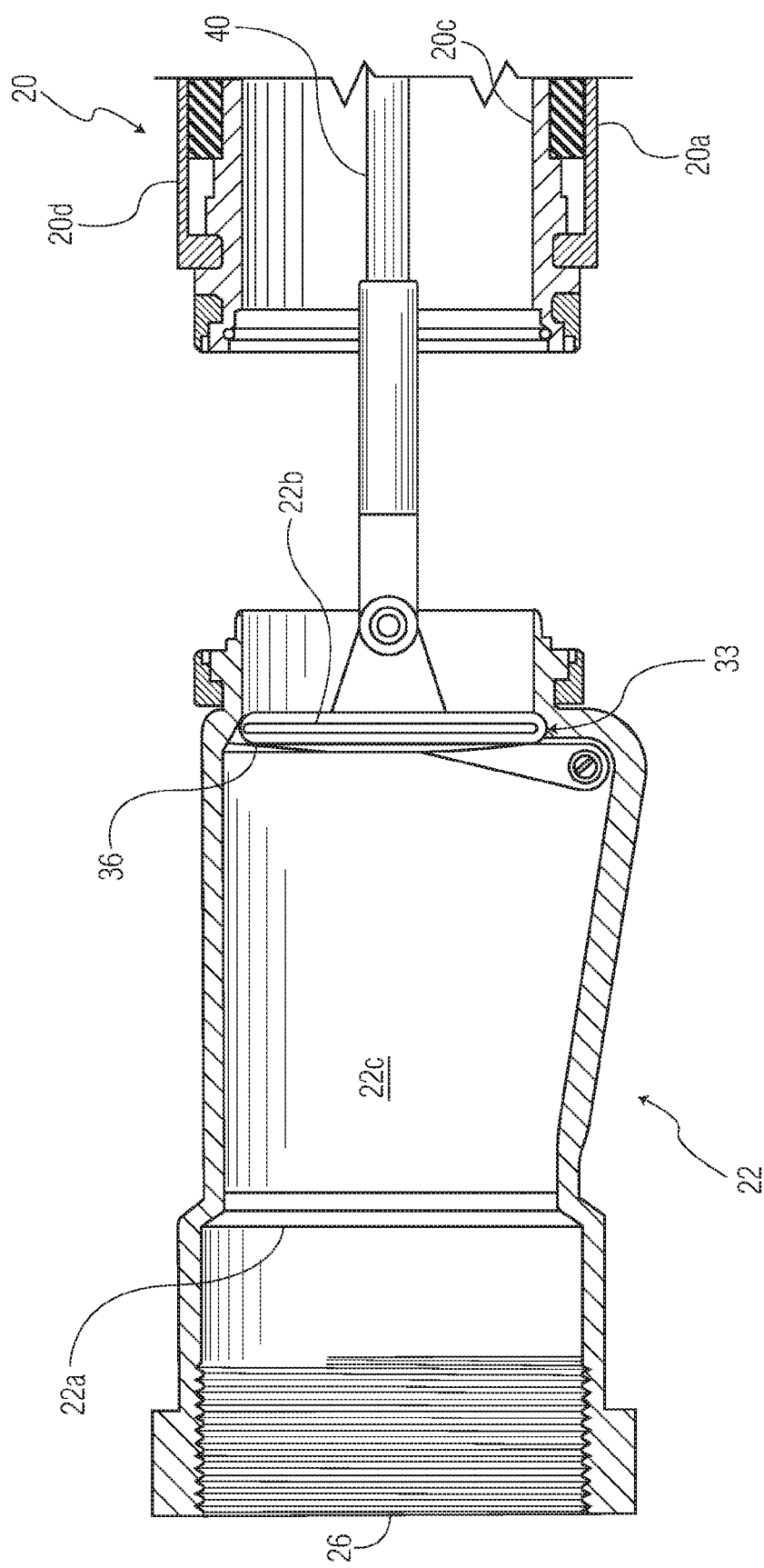
FIG. 4 is a sectional view, on an enlarged scale, of one end of the FIG. 2 high-pressure cryogenic fluid conduit shown in the closed or safety-activated mode of operation.

A high-pressure fluid conduit, constructed in accordance with the present invention, also includes a first valve seat 33 at second fluid opening 22b in first housing 22, a second valve seat 34 at first fluid opening 24a in second housing 24, a first valve body 36, and a second valve body 38. For the embodiment of the present invention illustrated and being described, first valve body 36 is pivotally mounted in cavity 22c of first housing 22 and is movable between a first position to permit the flow of the high-pressure cryogenic fluid from the high-pressure fluid source through the first housing, as illustrated in FIGS. 1 and 3, and a second position against first valve seat 33 in the first housing to prevent high-pressure cryogenic fluid leaving the first housing as illustrated in FIGS. 2 and 4. For the embodiment of the present invention illustrated and being described, second valve body 38 is pivotally mounted in cavity 24c of second housing 24 and is movable between a first position to permit the flow of the high-pressure cryogenic fluid from the high-pressure fluid source through the second housing, as illustrated in FIG. 1, and a second position against second valve seat 34 in the second housing to prevent high-pressure cryogenic fluid from the high-pressure fluid container leaving the second housing, as illustrated in FIGS. 2 and 4.

A high-pressure fluid conduit, constructed in accordance with the present invention, also includes valve control means for retaining first valve body 36 in its first position and second valve body 38 in its first position and selectively moving the first valve body to its second position against valve seat 33 and the second valve body to its second position against valve seat 34. The valve control means move first valve body 36 into engagement with first valve seat 33 and second valve body 38 into engagement with second valve seat 34 in response to a fracture of annular ring 30 and separation of first and second parts 30b and 30c of the annular ring.

Figure 7:
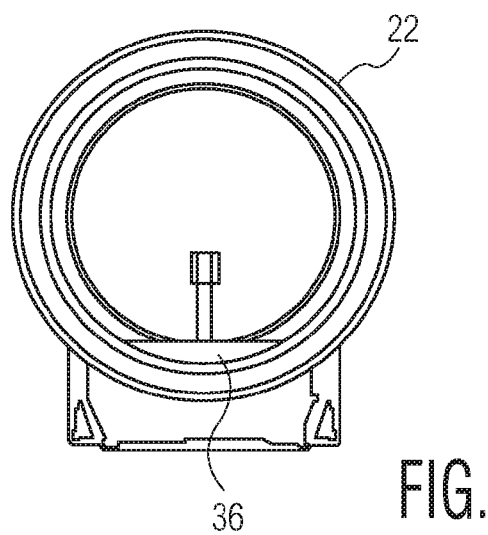
FIG. 7 is an end view of the FIG. 1 high pressure cryogenic fluid conduit while the high-pressure cryogenic fluid conduit is in the open or normal mode of operation.

More specifically, for the embodiment of the present invention that is illustrated and being described, the valve control means include a serpentine cable 40 connected between first valve body 36 and second valve body 38. Cable 40 is made from a flexible, yet relatively stiff, material capable of retaining valve bodies 36 and 38 in their respective first positions, as shown in FIGS. 1, 3, and 7, so that high-pressure cryogenic fluid from the high-pressure cryogenic fluid source is permitted to flow to the high-pressure cryogenic fluid container during open or normal fluid delivery.

Figure 9:
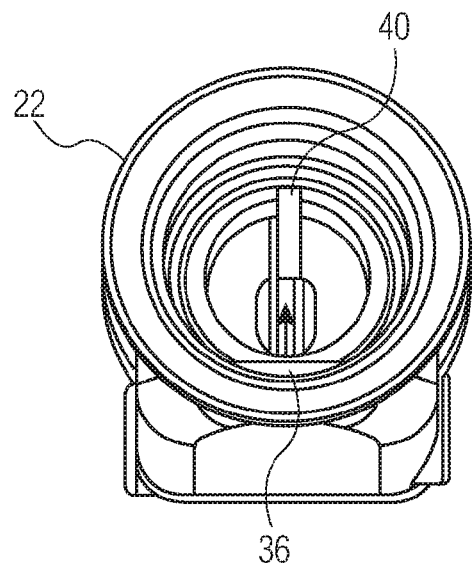
FIG. 9 is an end view of the FIG. 1 high pressure cryogenic fluid conduit after the high-pressure cryogenic fluid conduit switches to the FIG. 2 closed or safety-activated mode of operation.

Fracture of annular ring 30 results in increased separation of first housing 22 from second housing 24, which, in turn, causes cable 40 to straighten and ultimately to cause valve bodies 36 and 38 to pivot to their respective second positions, namely, against valve seats 33 and 34, respectively, as shown in FIGS. 2, 4, and 9. With valve bodies 36 and 38 positioned against valve seats 33 and 34, respectively, opening 22b of housing 22 and opening 24a of housing 24 are sealed to prevent high-pressure cryogenic fluid flow from the high-pressure cryogenic fluid source and high-pressure cryogenic fluid flow from the high-pressure cryogenic fluid container during a closed or safety-activated mode of operation. High-pressure cryogenic fluid, entering cavity 22c of housing 22 from the high-pressure cryogenic fluid source, maintains the seal between valve body 36 and valve seat 33 during the closed or safety-activated mode of operation. High-pressure cryogenic fluid, entering cavity 24c of housing 24 from the high-pressure cryogenic fluid container, maintains the seal between valve body 38 and valve seat 34 during the closed or safety-activated mode of operation.

Figure 10:
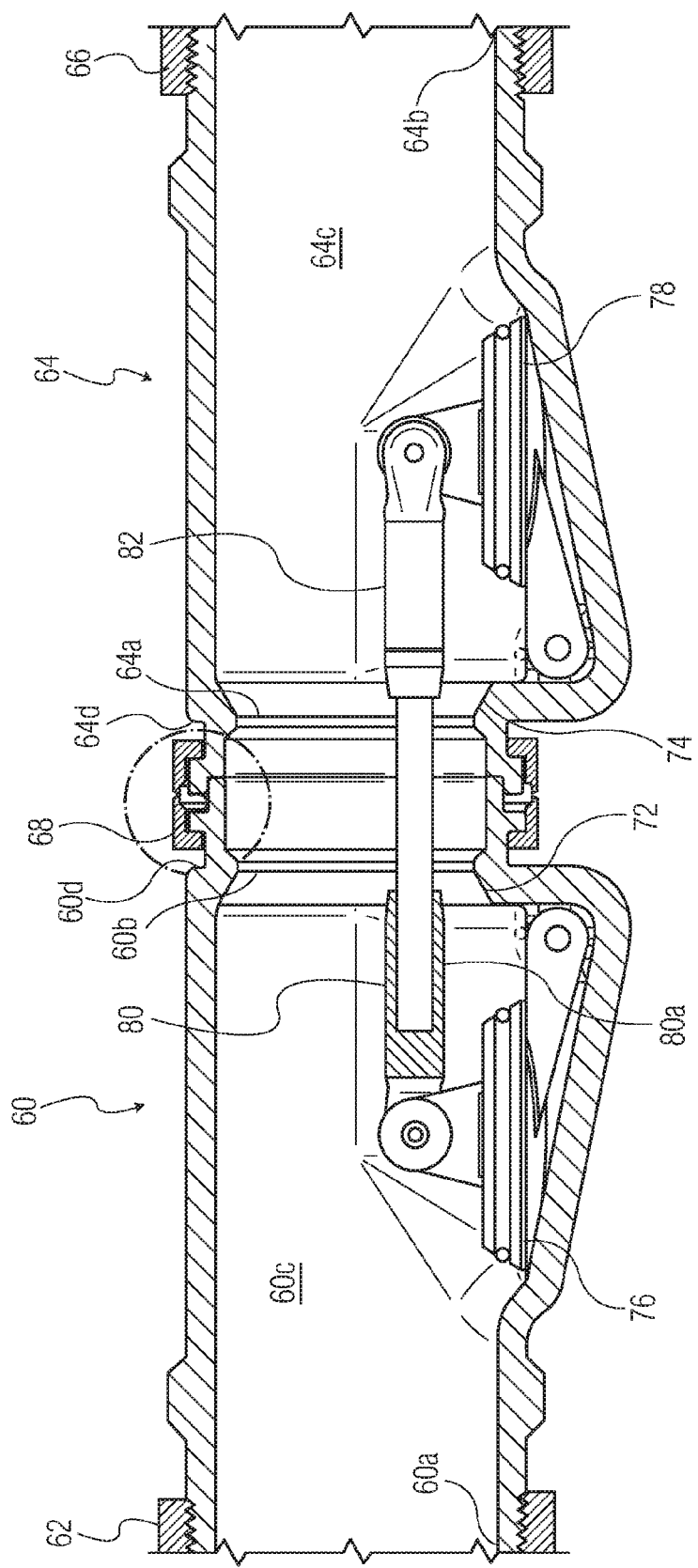
FIG. 10 is a sectional view of a third embodiment of a high-pressure cryogenic fluid conduit, constructed in accordance with the present invention, and illustrates the condition of this high-pressure cryogenic fluid conduit during open or normal operation.

FIG. 10 illustrates a third embodiment of a high-pressure cryogenic fluid conduit constructed in accordance with the present invention. This embodiment of the present invention can serve as an "in-line" connector installed in a piping system through which high-pressure cryogenic fluid is conducted. This embodiment of the present invention includes a first housing 60 adapted for connection to a first pipe section, represented by a threaded member 62, and a second housing 64 adapted for connection to a second pipe section, represented by threaded member 66.

Housing 60 has a first fluid opening 60a through which high-pressure cryogenic fluid from pipe section 62 enters housing 60, a second fluid opening 60b through which high-pressure cryogenic fluid from pipe section 62 leaves housing 60, and a cavity 60c between first fluid opening 60a in housing 60 and second fluid opening 60b in housing 60.

Housing 64 has a first fluid opening 64a aligned with second fluid opening 60b of housing 60 and through which high-pressure cryogenic fluid leaving housing 60 enters housing 64. Housing 64 also has a second fluid opening 64b through which high-pressure cryogenic fluid from pipe section 62 entering housing 64 leaves housing 64 and enters pipe section 66. Housing 64 also has a cavity 64c between first fluid opening 64a in housing 64 and second fluid opening 64b in housing 64.

Figure 11A:
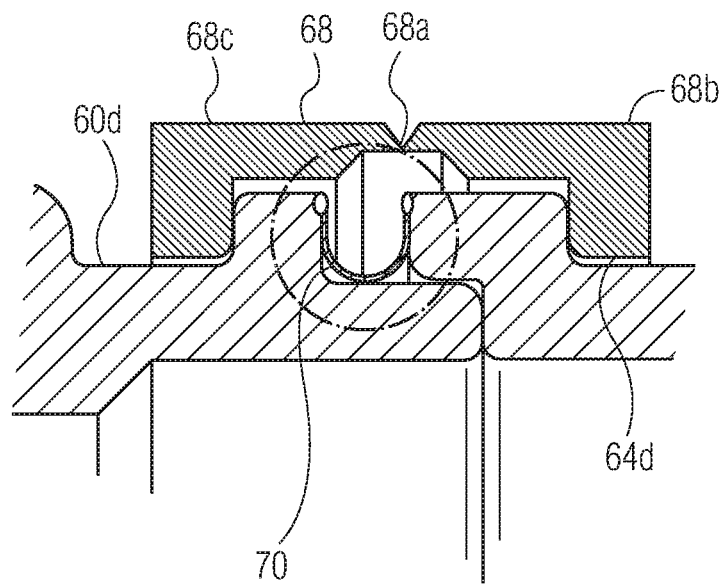
FIG. 11A is a sectional view, on an enlarged scale, of the break-away portion of the FIG. 10 high-pressure cryogenic fluid conduit.
Figure 11B:
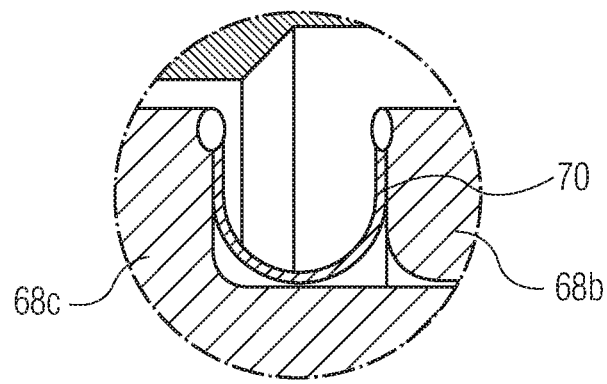
FIG. 11B is a sectional view, on an enlarged scale, of the FIG. 11A portion of the FIG. 10 high-pressure cryogenic fluid conduit.

As illustrated in FIGS. 10, 11A, and 11B, this embodiment of the present invention further includes a coupling 68 for coupling first housing 60 to second housing 64 and sensing separation of housing 60 and housing 64. In particular, coupling 68 is fitted in a notch 60d in housing 60 and a notch 64d in housing 64.

Coupling 68 has a weakened break-away section, in the form of a groove 68a for the embodiment of the invention illustrated and being described, that fractures when a predetermined force is applied to the coupling. Coupling 68 serves as a break-away component with parts 68b and 68c that separate permitting separation of first housing 60 and second housing 64 when, for example, there is a failure in the high-pressure cryogenic fluid conduit. Upon fracture of coupling 68, a safety feature is activated and the high-pressure cryogenic fluid conduit switches from an open or normal mode of operation to a closed or safety-activated mode of operation.

Figure 12:
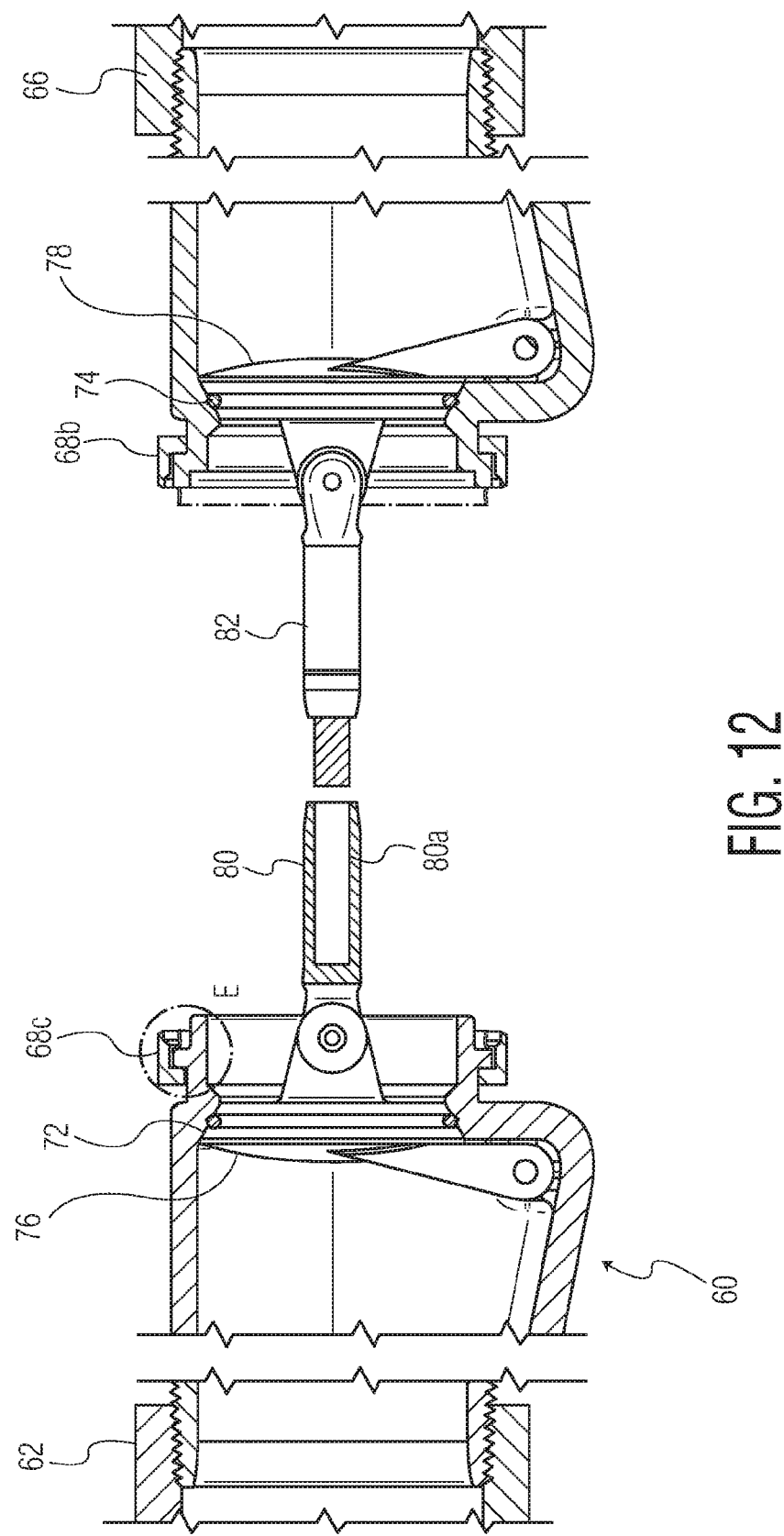
FIG. 12 is a sectional view of the FIG. 10 cryogenic high-pressure fluid conduit and illustrates the condition of this high-pressure cryogenic fluid conduit after a break-away event.

For this embodiment of the present invention, coupling 68 is an annular ring that extends circumferentially completely around the annular ring. The size, shape, and extent of groove 68a calibrate annular ring 68 to fracture when a predetermined force is applied to the annular ring, whereupon first and second parts 68b and 68c of the annular ring separate as illustrated in FIG. 12. It should be noted that this force, when applied generally along the longitudinal axis of the high-pressure cryogenic fluid conduit will result in substantially uniform separation of first and second parts 68b and 68c of annular ring 68 along groove 68a, while a force applied at an angle to the longitudinal axis of the high-pressure cryogenic fluid conduit will result in progressive separation of first and second parts 68b and 68c of the annular ring along groove 68a. Again, for more details about annular ring 68 and the manner in which it functions to couple two parts together and permits the two parts to separate when a predetermined force is applied to the annular ring, reference should be made to U.S. Pat. No. 8,336,570.

Figure 12A:
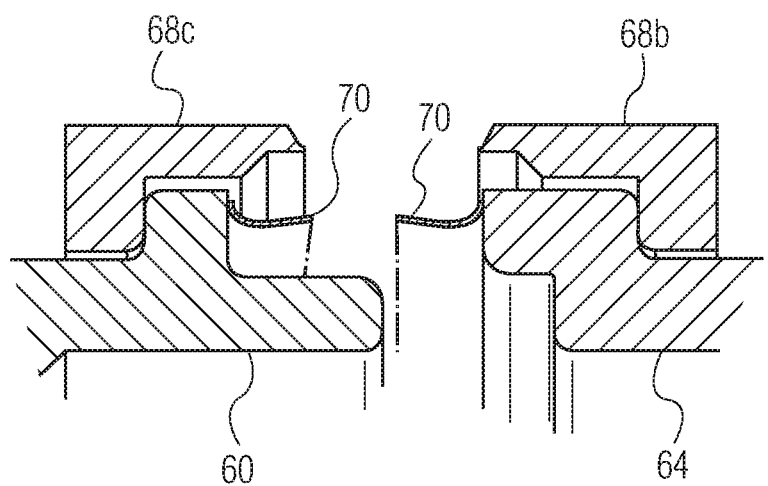
FIG. 12A is a sectional view, on an enlarged scale, of the break-away portion of the FIG. 10 high-pressure cryogenic fluid conduit after a break-away event.

As shown in FIGS. 11A and 11B, the FIG. 10 high-pressure cryogenic fluid conduit also includes a cryogenic seal 70 that seals the joint at which annular ring 68 couples first housing 60 to second housing 64. Cryogenic seal 70 extends between and is secured to first housing 60 and second housing 64 and is breakable, as shown in FIG. 12A, when first part 68b and second part 68c of annular ring 68 separate. For the embodiment of the invention illustrated and being described, cryogenic seal 70 is U-shaped. Cryogenic seal 70 can take other forms or configurations.

Also, for the embodiment of the invention illustrated and being described, cryogenic seal 70 is a metal, such as stainless steel, that is welded to first housing 60 and second housing 64. Cryogenic seal 70, flexible in nature, can be made of other materials, so long as it breaks when first part 68b and second part 68c of annular ring 68 separate. Also, cryogenic seal 70 can be secured to first housing 60 and second housing 64 by other means.

The FIG. 10 high-pressure cryogenic fluid conduit further includes a valve seat 72 at second fluid opening 60b in first housing 60 and a valve seat 74 at first fluid opening 64a in second housing 64.

The FIG. 10 high-pressure cryogenic fluid conduit further includes a first valve body 76 that is pivotally mounted in cavity 60c of first housing 60 and is movable between a first position to permit the flow of the high-pressure cryogenic fluid from pipe section 62 through housing 60, as shown in FIG. 10, and a second position against valve seat 72 in housing 60 to prevent high-pressure cryogenic fluid leaving housing 60, as shown in FIG. 12.

The FIG. 10 high-pressure cryogenic fluid conduit further includes a second valve body 78 that is pivotally mounted in cavity 64c of second housing 64 and is movable between a first position to permit the flow of the high-pressure cryogenic fluid from pipe section 62 through housing 64 to the high-pressure cryogenic fluid container, as shown in FIG. 10, and a second position against valve seat 74 in housing 64 to prevent back-flow of high-pressure cryogenic fluid from pipe section 66 leaving second housing 64, as shown in FIG. 12.

The FIG. 10 high-pressure cryogenic conduit further includes valve control means for retaining first valve body 76 in its first position and second valve body 78 in its first position and selectively moving first valve body 76 towards its second position and second valve body 78 towards its second position in response to fracture of coupling 68 and separation of parts 68b and 68c of coupling 68. For the embodiment of the present invention illustrated, the valve control means include a linkage having a first member 80 pivotally secured to first valve body 76 and a second member 82 pivotally secured to second valve body 78 and coupled to and separable from first member 80 of the linkage. Specifically, first member 80 of the linkage and second member 82 of linkage are coupled together by one of the members of the linkage (82 as illustrated) fitted into a bore hole 80a in the other of the members of linkage (80 as illustrated). During open or normal operation, linkage members 80 and 82 are coupled together with linkage member 82 fitted in bore hole 80a of linkage member 80. This fit between linkage members 80 and 82 is such that, upon separation of housings 60 and 64, as shown in FIGS. 12 and 12A, linkage member 82 withdraws from linkage member 80, so that the two linkage members separate and valve bodies 76 and 78 are permitted to move from their first positions out of the flow of high-pressure cryogenic fluid through housing 60 and 64, respectively, toward their second positions. The flow of high-pressure cryogenic fluid through housing 60 from the high-pressure cryogenic fluid source urges valve body 76 to its second position, namely against valve seat 72, thereby preventing the escape of high-pressure cryogenic fluid from pipe section from housing 60. The flow of high-pressure cryogenic fluid through housing 64 from pipe section 66 urges valve body 78 to its second position, namely against valve seat 74, thereby preventing the escape of high-pressure cryogenic fluid from pipe section 66.

The foregoing illustrates some of the possibilities for practicing the invention. Other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A high-pressure cryogenic fluid conduit adapted for connection between a high-pressure cryogenic fluid source and a high-pressure cryogenic fluid container, said high-pressure cryogenic fluid conduit comprising:
   a hose unit having a first end and a second end;
   a first housing adapted for connection to a high-pressure cryogenic fluid source and having:
      (a) a first fluid opening through which high-pressure cryogenic fluid from the high-pressure cryogenic fluid source enters said first housing,
      (b) a second fluid opening through which high-pressure cryogenic fluid from the high pressure cryogenic fluid source leaves said first housing and enters said hose unit, and
      (c) a cavity between said first fluid opening in said first housing and said second fluid opening in said first housing;
   a second housing adapted for connection to a high-pressure cryogenic fluid container and having:
      (a) a first fluid opening through which
         (1) high-pressure cryogenic fluid from the high-pressure cryogenic fluid source leaves said hose unit and enters said second housing, and
         (2) high-pressure cryogenic fluid from the high-pressure cryogenic fluid container tends to leave said second housing and enter said hose unit during a failure of said hose unit, (b) a second fluid opening through which:
  (1) high-pressure cryogenic fluid from the high-pressure cryogenic fluid source leaves said second housing and enters the high-pressure cryogenic fluid container, and
  (2) high-pressure cryogenic fluid from the high-pressure cryogenic fluid container tends to enter said hose unit during a failure of said hose unit, and
(c) a cavity between said first fluid opening in said second housing and said second fluid opening in said second housing;

a coupling:
  (a) coupling at least one of:
    (1) said first housing to said first end of said hose unit, and
    (2) said second housing to said second end of said hose unit, and
  (b) having a weakened section that fractures when a predetermined force is applied to said coupling that causes first and second parts of said coupling on opposite sides of said weakened section to separate;

a cryogenic seal:
  (a) extending between and secured to at least one of:
    (1) said first housing and said first end of said hose unit, and
    (2) said second housing and said second end of said hose unit, and
  (b) breakable when said first and second parts of said coupling separate;

a first valve seat at said second fluid opening in said first housing;

a second valve seat at said first fluid opening in said second housing;

a first valve body mounted in said cavity of said first housing and movable between:
  (a) a first position to permit the flow of the high-pressure cryogenic fluid from the high-pressure cryogenic fluid source through said first housing, and
  (b) a second position against said first valve seat in said first housing to prevent high-pressure cryogenic fluid leaving said first housing;

a second valve body mounted in said cavity of said second housing and movable between:
  (a) a first position to permit the flow of the high-pressure cryogenic fluid from the high-pressure cryogenic fluid source through said second housing, and
  (b) a second position against said second valve seat in said second housing to prevent the flow of high-pressure cryogenic fluid from the high-pressure cryogenic fluid container leaving said second housing; and a valve control:
  (a) retaining said first valve body in its first position and said second valve body in its first position, and
  (b) selectively moving said first valve body to its second position and said second valve body to its second position in response to fracture of said coupling and separation of said first and second parts of said coupling on opposite sides of said weakened section of said coupling.

2. A high-pressure cryogenic fluid conduit according to claim 1 wherein:
  (a) said first valve body is pivotally mounted in said cavity of said first housing, and
  (b) said second valve body is pivotally mounted in said cavity of said second housing.

3. A high-pressure cryogenic fluid conduit according to claim 2 wherein said coupling is an annular ring.

4. A high-pressure cryogenic fluid conduit according to claim 3 wherein said weakened section of said annular ring has a reduced thickness, relative to the thickness of said first and second parts of said annular ring, that extends completely around said annular ring.

5. A high-pressure cryogenic fluid conduit according to claim 4 wherein said weakened section of said annular ring is a continuous groove that extends circumferentially of said annular ring.

6. A high-pressure cryogenic fluid conduit according to claim 5 wherein said cryogenic seal is U-shaped.

7. A high-pressure cryogenic fluid conduit according to claim 6 wherein said cryogenic seal is made from a metal and is welded to said first housing and said second housing.

8. A high-pressure cryogenic fluid conduit according to claim 7 wherein said valve control includes a serpentine cable connected between said first valve body and said second valve body.

9. A high-pressure cryogenic fluid conduit according to claim 7 wherein said valve control includes a linkage having:
  (a) a first member pivotally secured to said first valve body, and
  (b) a second member pivotally secured to said second valve body and coupled to and separable from said first member of said linkage.

10. A high-pressure fluid conduit according to claim 9 wherein said first member of said linkage and said second member of said linkage are coupled together by one of said members of said linkage fitted into a bore hole in the other of said members of said linkage.

11. A high-pressure cryogenic fluid conduit comprising:
a first housing adapted for connection to a high-pressure cryogenic fluid source and having:
  (a) a first fluid opening through which high-pressure cryogenic fluid from a high-pressure cryogenic fluid source enters said first housing,
  (b) a second fluid opening through which high-pressure cryogenic fluid from the high-pressure cryogenic fluid source leaves said first housing, and
  (c) a cavity between said first fluid opening in said first housing and said second fluid opening in the said first housing;

a second housing:
  (a) abutting said first housing,
  (b) adapted for connection to a high-pressure cryogenic fluid container, and
  (c) having:
    (1) a first fluid opening aligned with said second fluid opening of said first housing and through which high-pressure cryogenic fluid leaving said first housing enters said second housing,
    (2) a second fluid opening through which high-pressure cryogenic fluid from the high-pressure cryogenic fluid source entering said second housing leaves said second housing and high-pressure cryogenic fluid from the high-pressure cryogenic fluid container tends to reenter said second housing upon separation of said first housing and said second housing, and
    (3) a cavity between said first fluid opening in said second housing and said second fluid opening in said second housing;

a coupling:
- (a) coupling said first housing to said second housing,
- (b) having a weakened break-away section that fractures when a predetermined force is applied to said coupling that causes parts of said coupling to separate and permits separation of said first housing and said second housing;

a cryogenic seal extending between and secured to said first housing and said second housing and breakable when said parts of said coupling separate;

a valve seat at said second fluid opening in said first housing;

a valve seat at said first fluid opening in said second housing:

a first valve body mounted in said cavity of said first housing and movable between:
- (a) a first position to permit the flow of the high-pressure cryogenic fluid from the high-pressure cryogenic fluid source through said first housing, and
- (b) a second position against said valve seat in said first housing to prevent high-pressure cryogenic fluid leaving said first housing:

a second valve body mounted in said cavity of said second housing and movable between:
- (a) a first position to permit the flow of the high-pressure cryogenic fluid from the high-pressure cryogenic fluid source through said second housing, and
- (b) a second position against said valve seat in said second housing to prevent the flow of high-pressure cryogenic fluid leaving said second housing; and a valve control:
- (a) retaining said first valve body in its first position and said second valve body in its first position, and
- (b) selectively moving said first valve body towards its second position and said second valve body towards its second position in response to fracture of said coupling and separation of said parts of said coupling.

12. A high-pressure cryogenic fluid conduit according to claim 11 wherein:
- (a) said first valve body is pivotally mounted in said cavity of said first housing, and
- (b) said second valve body is pivotally mounted in said cavity of said second housing.

13. A high-pressure cryogenic fluid conduit according to claim 12 wherein said coupling is an annular ring.

14. A high-pressure cryogenic fluid conduit according to claim 13 wherein said weakened section of said annular ring has a reduced thickness, relative to the thickness of said first and second parts of said annular ring, that extends completely around said annular ring.

15. A high-pressure cryogenic fluid conduit according to claim 14 wherein said weakened section of said annular ring is a continuous groove that extends circumferentially of said annular ring.

16. A high-pressure cryogenic fluid conduit according to claim 15 wherein said cryogenic seal is U-shaped.

17. A high-pressure cryogenic fluid conduit according to claim 16 wherein said cryogenic seal is made from a metal and is welded to said first housing and said second housing.

18. A high-pressure cryogenic fluid conduit according to claim 17 wherein said valve control includes a serpentine cable connected between said first valve body and said second valve body.

19. A high-pressure cryogenic fluid conduit according to claim 17 wherein said valve control includes a linkage having:
- (a) a first member pivotally secured to said first valve body, and
- (b) a second member pivotally secured to said second valve body and coupled to and separable from said first member of said linkage.

20. A high-pressure fluid conduit according to claim 19 wherein said first member of said linkage and said second member of said linkage are coupled together by one of said members of said linkage fitted into a bore hole in the other of said members of said linkage.

21. A high-pressure cryogenic fluid conduit according to claim 1 wherein said coupling is an annular ring.

22. A high-pressure cryogenic fluid conduit according to claim 21 wherein said weakened section of said annular ring has a reduced thickness, relative to the thickness of said first and second parts of said annular ring, that extends completely around said annular ring.

23. A high-pressure cryogenic fluid conduit according to claim 22 wherein said weakened section of said annular ring is a continuous groove that extends circumferentially of said annular ring.

* * * * *